United States Patent
Thukkaram et al.

(10) Patent No.: US 12,450,076 B1
(45) Date of Patent: Oct. 21, 2025

(54) SYSTEM AND METHOD OF CREATING A SHADOW REPRESENTATION OF THE USER INTERFACE FOR FASTER UI ELEMENT RETRIEVAL

(71) Applicant: Whatfix Private Limited, Bangalore (IN)

(72) Inventors: Muthukrishnan Thukkaram, Bangalore (IN); Rahul Mhambrey, Bangalore (IN); Anupriya, Bangalore (IN); Lalitashree Ravi Hegde, Bangalore (IN)

(73) Assignee: Whatfix Private Limited, San Jose, CA (US)

( * ) Notice: Subject to any disclaimer, the term of this patent is extended or adjusted under 35 U.S.C. 154(b) by 130 days.

(21) Appl. No.: 18/398,544

(22) Filed: Dec. 28, 2023

(51) Int. Cl.
G06F 9/451 (2018.01)

(52) U.S. Cl.
CPC .................................. *G06F 9/453* (2018.02)

(58) Field of Classification Search
CPC ...... G06F 9/453; G06F 3/1454; G06F 3/0484; G06F 3/0481; G06F 3/0485
See application file for complete search history.

(56) References Cited

U.S. PATENT DOCUMENTS

| | | | | |
|---|---|---|---|---|
| 6,904,563 B2* | 6/2005 | Kumhyr | ................. | G06F 40/58 715/256 |
| 9,417,888 B2* | 8/2016 | Forstall | ................. | G06F 3/0482 |
| 10,386,995 B2* | 8/2019 | Sepulveda | .......... | G06F 3/04886 |
| 2004/0267515 A1* | 12/2004 | McDaniel | .......... | G05B 19/0426 703/22 |
| 2005/0172243 A1* | 8/2005 | Pabla | .................... | G06F 9/4492 715/831 |
| 2013/0151999 A1* | 6/2013 | Seul | ........................ | G06F 9/451 715/762 |
| 2015/0346982 A1* | 12/2015 | Johnson | .............. | G06F 11/3698 715/763 |

* cited by examiner

*Primary Examiner* — Tadesse Hailu
(74) *Attorney, Agent, or Firm* — PATENT LAW WORKS LLP

(57) ABSTRACT

A system and method are disclosed for creating a shadow representation of a user interface. The shadow representation which may take the form of a shadow UI cache is updated in response to detected structure change events. An exemplary application of the shadow representation is to improve the UI element retrieval for a digital adoption platform.

21 Claims, 11 Drawing Sheets

Fig. 2B

```
{
  16248:{
    "pane[Acturis Platform]": <IUIAutomationElement1>,
    "paneTOPtop": <IUIAutomationElement2>,
    "pane[policy Admin|policyAdminTabbed": <IUIAutomationElement3>,
    "ButtonOpen Grid Preferances": <IUIAutomationElement4>,
    "ButtonOpen Collapse Pane": <IUIAutomationElement5>,
    "ButtonOpen Expand Pane": <IUIAutomationElement6>,
    "pane":{
      "1268_2276_20096": <IUIAutomationElement1>,
      "7671_2323_20096": <IUIAutomationElement2>,
      "1345_7890_20096": <IUIAutomationElement3>,
    },
    "button":{
      "1254_2356_20096": <IUIAutomationElement1>,
      "4349_6783_20096": <IUIAutomationElement2>,
      "2537_6351_20096": <IUIAutomationElement3>,
    },
  }
}
```

Fig. 3

| event.structureChangeType | event.sender | event.runtimeId |
|---|---|---|
| ChildAdded | The child that was added. | The child that was added. |
| ChildRemoved | The parent of the child that was removed. | The child that was removed. |
| ChildrenBulkAdded | The parent of the children that were added. | The parent of the children that were added. |
| ChildrenBulkRemoved | The parent of the children that were removed. | The parent of the children that were removed. |
| ChildrenInvalidated | The parent of the children that were invalidated. | The parent of the children that were invalidated. |

Fig. 5

```
{
    "Name":"Microsoft Teams",
    "ControlType":50030,
    "Index":0,
    "ChildElement":{
        "Name":"Desktop-internal, General channel content",
        "ControlType":50026,
        "Index":14,
        "ChildElement":{
            "Name":"message list",
            "ControlType":50026,
            "Index":0,
            "ChildElement":{
                "Name":"05 July 2022",
                "ControlType":50020,
                "Index":13,
                "ChildElement":null
            }
        }
    }
}
```

Fig. 6

SYSTEM AND METHOD OF CREATING A SHADOW REPRESENTATION OF THE USER INTERFACE FOR FASTER UI ELEMENT RETRIEVAL

TECHNICAL FIELD

The present disclosure is related to digital adoption platform technology and the retrieval of UI elements.

BACKGROUND

A digital adoption platform (DAP) is a type of software that is layered on top of another software, app, or website to help facilitate end user proficiency by helping to guide users through key tasks and provide contextual information as users navigate the user interface of the product. Users are provided with information to help familiarize them and become more proficient. This helps to drive adoption.

For example, a DAP may generate a help tip. Background information on an example DAP implementation is found in various sources, including U.S. Pat. Nos. 11,372,661 and 11,461,090, assigned to Whatfix Private Limited, the contents of each of which are hereby incorporated by reference. A DAP supports content authoring modules and content playback modules to generate, for example, smart tips as a user navigates elements of a user interface of an underlying software application.

A DAP supports content creators creating new flows or other guided features to enable higher adoption of client applications. Content Creators of the product can create content, record a flow, and the content is played back at the same flow as and when required when end-user clients navigate the client application. This requires the DAP to find the visual UI elements on the application the user is looking at (e.g., finding where the user's cursor is located on a graphical user interface.

One algorithm used for finding elements employs the UIAutomation library (the officially supported library from Microsoft® for .Net framework), which is primarily designed for automation testing, making it suboptimal for speed. Some example methods used in the industry include using the FindAll and FindFirst, to locate elements on the screen based on provided properties. FindFirst returns the first matching element, while FindAll retrieves all elements that match the given properties. Unfortunately, these approaches lack room for optimization, particularly when there is a large number of elements. For example, if a page contains more than 500 elements, the tree traversal can be quite slow, taking anywhere from 3 to 10 seconds.

It is possible to create walkthroughs using the standard FindAll API of the UIAutomation library. The desired elements are found using the methods of the UIAutomation library like FindAll and FindFirst which take about 3-10 seconds on most of the standard desktop applications. The time taken is much longer when the machines are low end. This performance is acceptable for applications which are meant for Automation but not for applications built for providing DAP assistance with guided flows that provide an acceptable user experience.

To mitigate performance issues when there is a large number of elements or a complete hierarchy, one option is to use element selectors. By providing an exact path or precise element matcher, the time it takes to find elements using FindFirst is reduced. This typically brings the finding time to under 5 seconds. However, the challenge lies in identifying the most optimal element selector, which is a complex and technical task. Even with the element selectors, the finding process might still exceed 5 seconds in some cases when trying to locate elements deep within a tree hierarchy. This is due to the algorithm's internal use of Breadth First Search, which might not be the most efficient approach for such scenarios.

An unresolved problem in the prior art is that conventional algorithms have problems handling large numbers of elements or complex hierarchies. The automation APIs provided out of the box by major vendors are not optimized for speed as their core use case is process automation. However, for DAP, a delay of even 1 second is not acceptable from a user experience standpoint.

SUMMARY

A system and method are disclosed for creating a shadow representation of a user interface. In one implementation, the shadow representation may take the form of a shadow User Interface (UI) cache that is updated in response to detected structure change events. An exemplary application of the shadow UI cache and shadow representation is to improve the UI element retrieval for a digital adoption platform.

In one implementation, a method of finding visual user interface elements of a desktop application for a digital adoption platform (DAP) includes monitoring structure change automation events in a graphical user interface (GUI) of a target desktop application; updating a shadow UI cache representation of the UI screen elements in response to detecting structure change automation events; and in response to a request from a finder for screen element information to provide DAP assistance as a user navigates the target application, accessing the Shadow UI cache to search for screen element information to fulfill the request.

In one implementation, the method further includes utilizing a structure change event handler for detecting structure change automation events to the target desktop application.

In one implementation of the method, in response to a cache miss of the shadow UI cache, a traversal path engine is utilized to traverse a UI screen element tree hierarchy to search for one or more screen elements to fulfill the request from the finder.

In one implementation of the method, the method further includes initially populating the shadow UI cache utilized a FindAll API.

In one implementation the method further includes updating the shadow UI cache after a cache miss.

In one implementation, the method further includes removing one or more references to UI elements in the shadow UI cache in response to detecting a remove event.

In one implementation, the method further includes clearing the shadow UI cache in response to a pre-determined cache clearance condition.

In one implementation of the method, the structure change events include at least one of a child element added, a child element removed, children bulk added, children bulk removed, and children invalidated.

In one implementation of the method, the shadow UI cache comprises information associated with a set of IUIAutomation Elements corresponding to the visual screen elements of the UI.

In another implementation of a method the method is a computer-implemented method of finding visual user interface elements of a desktop application for a digital adoption platform (DAP. The method includes attaching a structure change event handler to a target application for which DAP assistance is to be provided as a user navigates a graphical user interface of the target application; initially populating a shadow UI cache with element information of the graphical user interface of the target application; monitoring structure change automation events in the GUI of the target desktop application; updating a shadow UI cache representation of the UI screen elements in response to detecting structure change automation events; and in response to a request from a finder for screen element information to provide DAP assistance as a user navigates the target application, accessing the shadow UI cache to search for screen element information to fulfill the request.

BRIEF DESCRIPTION OF THE DRAWINGS

FIG. 2B illustrates the user interface of FIG. 2A.

FIG. 3 illustrates a technical representation of a shadow UI cache in accordance with an implementation.

FIG. 5 illustrates an example of structure change event types in accordance with an implementation.

FIG. 6 illustrates an example of a traversal path in accordance with an implementation.

DETAILED DESCRIPTION

Figure 1:
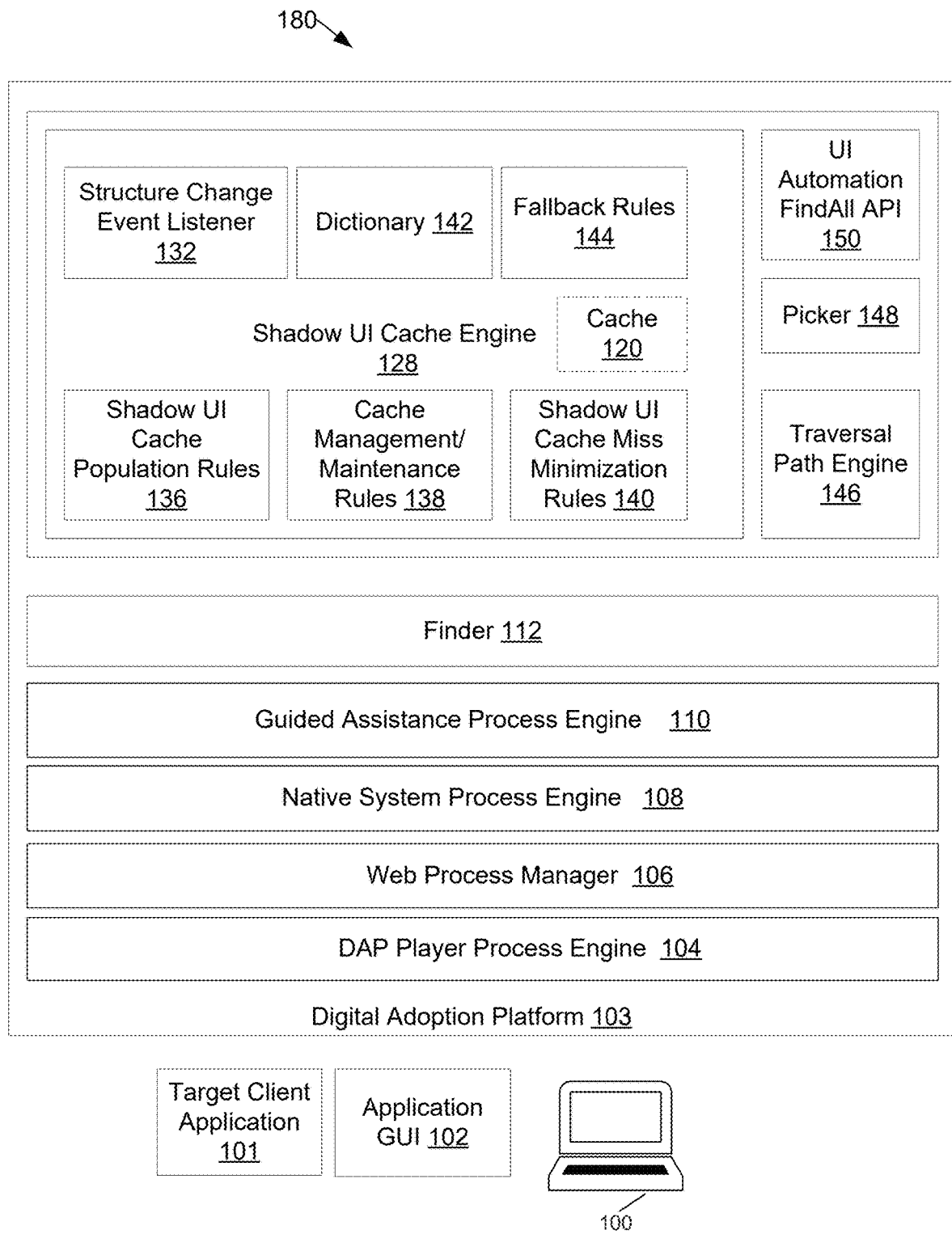
FIG. 1 illustrates an embodiment of a DAP system with a shadow cache representation of a UI in accordance with an implementation.

FIG. 1 is a block diagram of a high-level implementation of an example of system for using a shadow User Interface (UI) cache for a digital adoption platform 103. The digital adoption platform 102 provides guidance for a target client application 101, which may, for example, be displayed on a display screen of a desktop computer 100. As an illustrative example, a target client application 101 running on the desktop of a client computer 100 generates a graphical user interface (GUI) 102 that is displayed on a computer display screen of the computer 100. The target client application may, for example, generate different application display screens (e.g., a calendar screen, a teleconference screen, etc.). The DAP 103 uses a finder 112 to find UI screen elements, which is important to provide the correct DAP guidance, such as help tips for the target client application.

In one implementation, the DAP 103 includes a DAP player process engine 104 to implement a player process; a Web component 106 to implement a Web process; a native system process engine 108 to implement a native process; and a guided assistance process engine 110 to implement a guided assistance process.

In one implementation, a shadow UI cache engine 128 caches UI information in a shadow UI cache 120, where the shadow UI cache 120 is a shadow representation of the UI interface tree. The shadow UI cache 120 supports fast element finding to reduce search time, especially when dealing with intricate and deep UI screen element tree hierarchies. Reducing the search time ensures that the DAP overlay elements are shown to the user with minimal lag enhancing the user experience. Thus, an overall in the performance of the computing system is achieved for supporting DAP.

In one implementation, this shadow cache representation is created in real time (or near real time) while the user interacts with the target application. For example, a complex graphical user interface may have 500 to 30,000 screen elements. There is a time for a UI screen to be initially loaded. The initial population of the shadow UI cache 120 can occur in parallel while the screen is loading. In terms of user experience, users find a response time for DAP of greater than one second to not be consistent with a pleasant user experience. A finder response time of less than one second is desirable, with less than 500 ms being preferred.

The shadow UI cache representation is a collection of element references stored in cache memory for faster access. Once the shadow UI cache 120 is created, the find operations for UI elements are executed on this shadow UI cache instead of executing all the find operations on the actual target application. By leveraging this approach, a remarkable speed improvement is achieved while maintaining accuracy in element finding.

This cache-based method ensures that previously located UI elements are readily available for future queries, eliminating the need to repeatedly traverse the original UI. As a result, the find operations are executed with greatly improved efficiency, providing a seamless user experience even when dealing with complex UI structures.

The shadow UI cache 120 is temporary and has one or more rules for clearing the cache in response to detecting a cache clearance condition is satisfied. For example, a cache management and maintenance unit 138 may implement one or more rules to clear the cache, such as when the page changes, when the target application is closed, or when some other condition is satisfied, such as a maximum elapsed time with no activity of the DAP (e.g., a half-hour, but more generally a configurable maximum elapsed time).

A shadow UI cache population rules module 136 may include rules for initially populating a shadow UI cache 120, such as populating a shadow UI cache 120 for a target application that is launched and for which DAP assistance is to be provided. Additionally, rules may be included for repopulating the shadow UI cache 120. More generally, the shadow UI cache 120 may be optimized in terms of space complexity. In one implementation, the initial population or repopulation of the shadow UI cache 120 is performed for the higher levels of a UI tree but not necessarily initially at all levels of the UI tree. For example, in a complex UI with many screen elements, the cache may be initially filled in at higher levels of the UI tree and then filled in at lower levels of the UI tree. There may be an optional sequence for populating levels of the hierarchy of the shadow UI cache. As an illustrative but non-limiting example, if a UI has 30,000 elements there may be some higher levels of the UI tree that a user is statistically more likely to explore first in terms of needing DAP assistance (e.g., in providing a tool tip) before other deeper levels.

In some use case scenarios, a single shadow UI cache 120 is used to support DAP assistance for a single target application. But an individual shadow UI cache 120 may be segmented; alternatively, two or more shadow UI caches 120 may be supported. Having a more complex cache structure may, for example, be used to support different cache regions for different target applications. For example, a user may have two or more target applications they interact with on their desktop. Support may be provided to implement a separate shadow UI cache region for each active target application, either as a segmented cache or as two separate caches. As another example, an individual target application may have different application tags for different aspects of its operation which would have different event handles. For this situation, support may also be provided to implement a separate shadow UI cache region for each active target application, either as a segmented cache or as two separate caches.

In a preferred implementation, all the screen elements of a user interface screen are cached in a shadow UI cache 120 and updated in response to structural changes to support fast response. There is preferably an initial population of the cache and subsequent updates to the cache to reflect changes to the UI. However more generally, predictive techniques could be used in some situations to predict updates to be made in the cache.

While a set of defined trigger conditions may be defined for populating the cache, updating the shadow UI cache 120, and removing items from the cache, more generally many variations are possible. For example, the shadow UI cache 120 may be updated as the user navigates a visual UI of a target application.

A variety of features may be included to optimize performance, including one or more policies to minimize the effects of deleterious shadow UI cache misses 140. This may include fallback rules 144 to define when fallback policies are implemented to provide a more robust solution. Fallback rules may be provided to address the situation where the shadow UI cache 120 lacks an entry and implements an alternate approach to provide requested screen element information.

In one implementation, a structure change event listener 132 detects structure change automation events to the UI and triggers an update of the shadow UI cache 120. For example, as a user navigates a screen page of a target application, there may be updates to a portion of the UI.

A traversal path engine 146 may be provided to implement a traversal path algorithm to efficiently traverse a tree hierarchy in the event that cache 129 lacks an entry. A UI automation FindAll API module 150 may be included as an additional fallback technique or to initially populate or repopulate the cache.

A dictionary 142 may be supported to store mapping definitions. In one implementation, the dictionary includes entries for IUI automation elements and mapping information. In one implementation, the dictionary is of IUIAutomation elements mapped with reliable element properties. For example, a dictionary Dictionary<IntPtr, Dictionary<string, IUIAutomationElement>> may be implemented as a dictionary of IUIAutomation elements mapped with a combination of each elements' reliable properties such as control type, name, automation id and class name. This key value pair is then mapped with the control type and this cache is different for each window handle. {wnd_handle, {Cache_key, {element}}.

The information cached in the shadow UI cache 120 provides consistent and rapid element retrieval, regardless of the page size or element depth. This approach doesn't require a reliance on selectors for speed enhancement. Instead, by leveraging structure change automation events, an efficient and responsive shadow caching mechanism is formed. This structure change event-driven approach is implemented to capture and update the shadow UI cache 120 only when necessary, significantly reducing the overhead associated with caching. As a result, the shadow cache representation supports speed improvements over conventional approaches. Dynamic rapid cache updates keep pace with dynamic changes in the user interface. Consequently, the caching mechanism remains highly relevant and responsive, ensuring an enhanced user experience and improved overall performance.

In one implementation, the shadow UI cache 120 is updated in response to detecting a structure change automation event. As an example, the Microsoft® UI Automation event notification is a key feature for assistive technologies such as screen readers and screen magnifiers. These UI Automation clients track events that are raised by UI Automation providers when something happens in the UI and that use the information to notify end users. Structure change events are one of them.

Figure 2A:
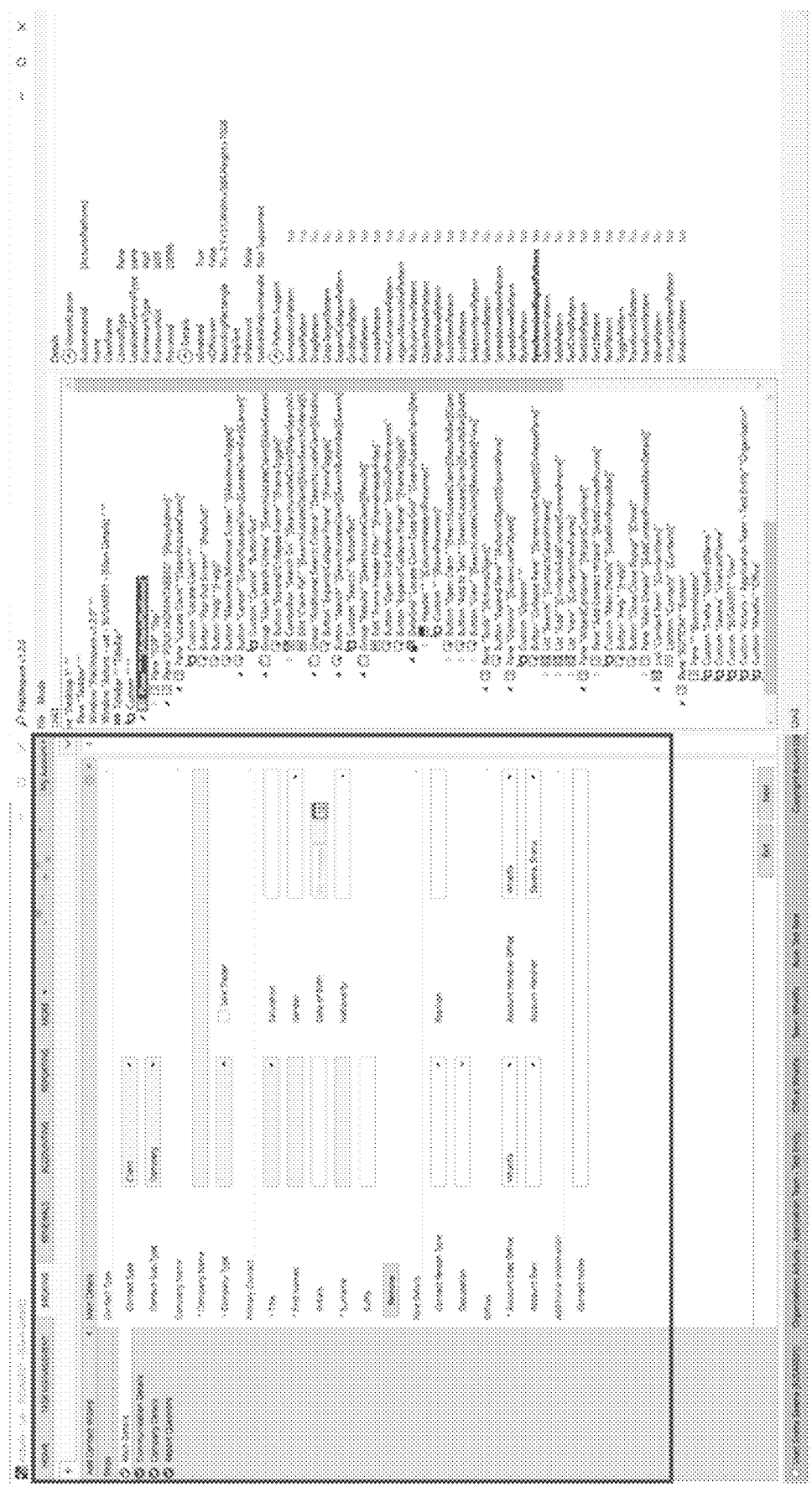
FIG. 2A illustrates a User interface and associated UI tree.
Figure 2B:
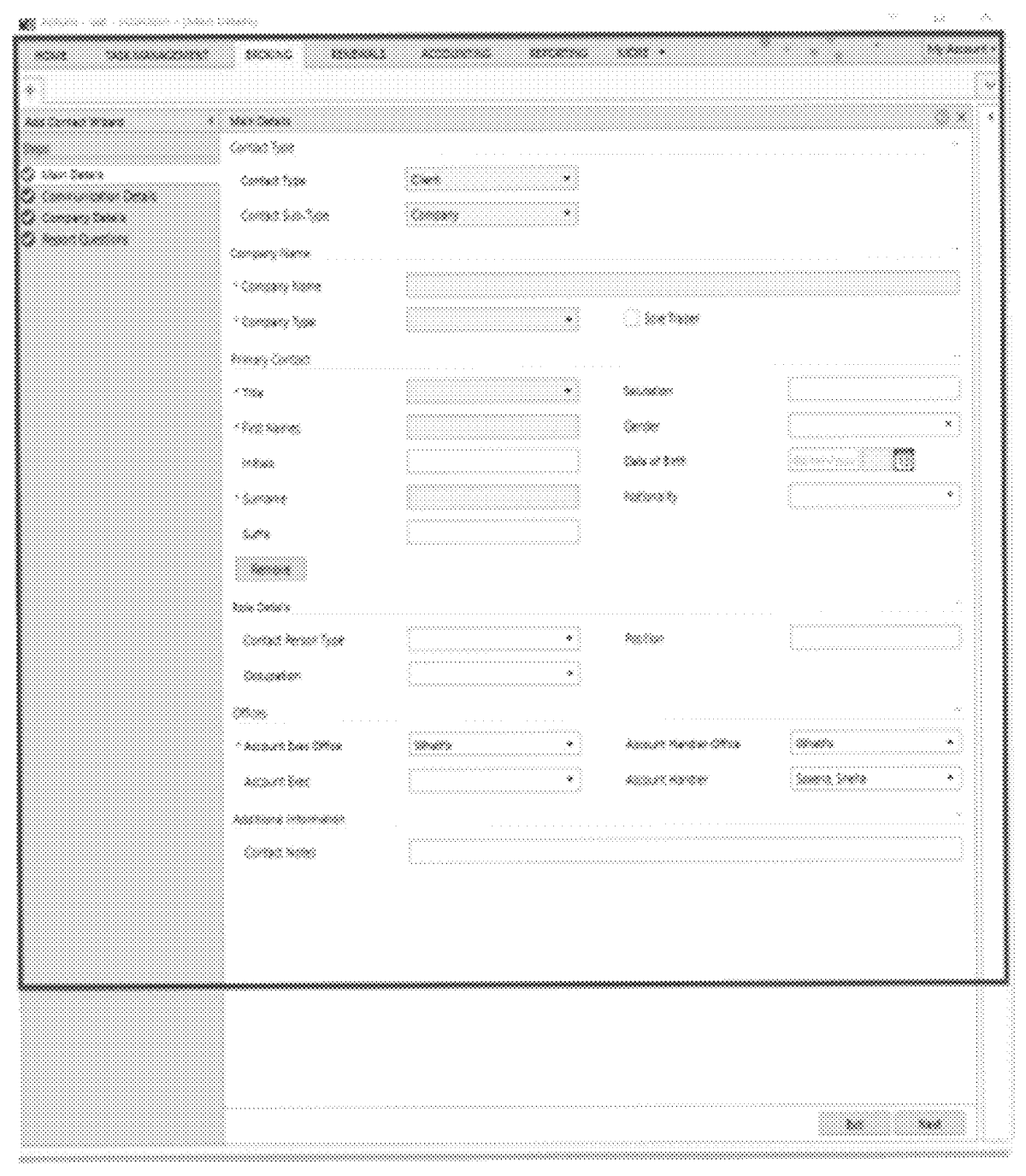
Figure 2C:
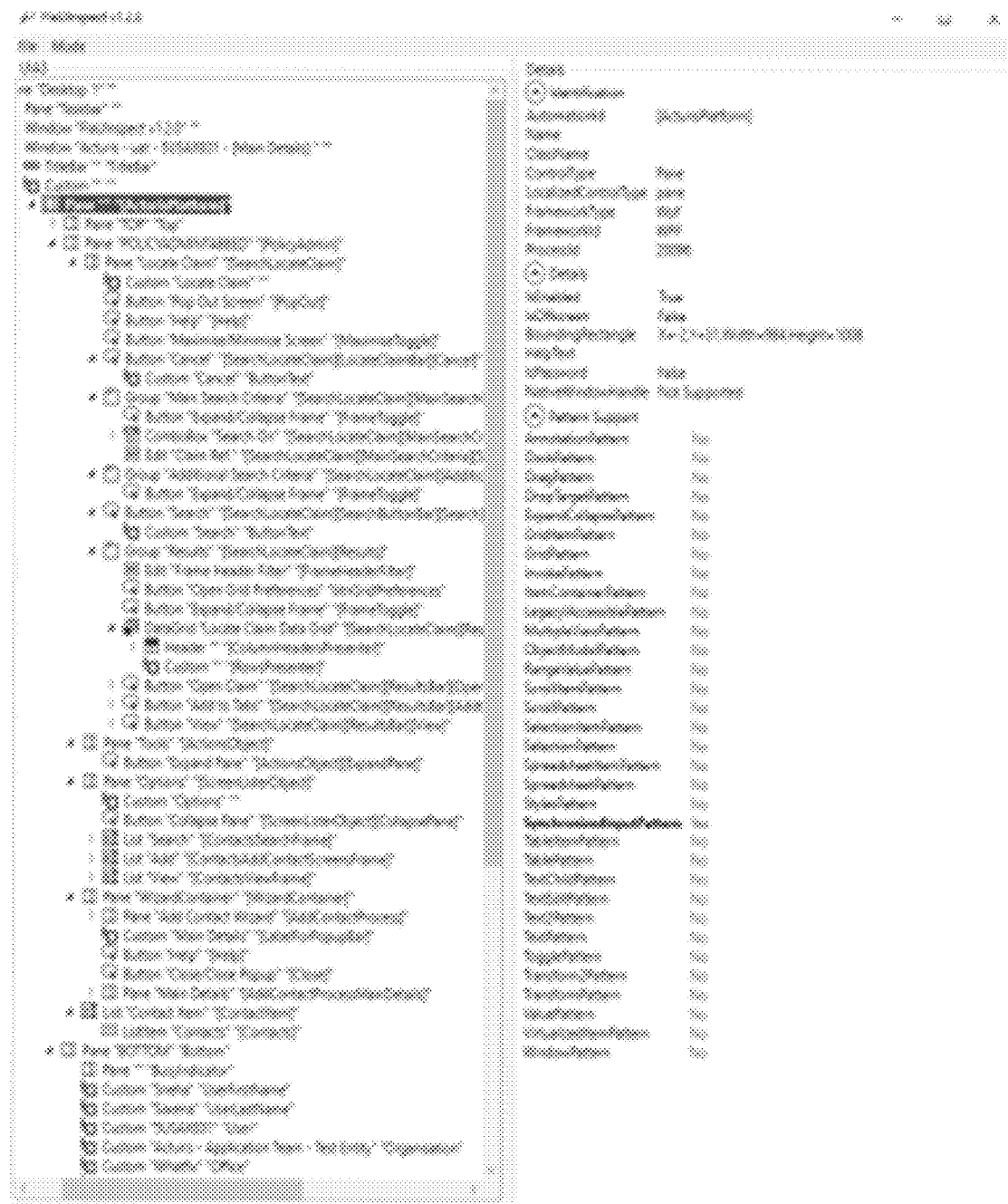
FIG. 2C illustrates the UI tree of FIG. 2A.

FIG. 2A illustrates a representation of an application UI (left, shown in more detail in FIG. 2B) along with the corresponding UI Tree (right, shown in more detail in FIG. 2C). The shadow UI cache tries to replicate the same UI tree but in cache memory. In this example, the UI screen is for a contact wizard with a selection of contact attribute fields, some of which are highlighted.

FIG. 3 illustrates an example of a representation of a shadow UI cache using UI Automation techniques. The use of UIAutomation provides a way to attach a listener to a window handle for capturing structure changes in the UI called a StructureChangeEvent. This is similar to MutationObservers in Javascript. In the example of FIG. 3, a set of IUIAutomation Elements is illustrated representing a set of panes and buttons corresponding to the screen elements of a UI.

In one implementation, a shadow UI cache representation is generated of the currently active window the first time the DAP interacts with the target application. Finder calls are then run off of this shadow UI cache, which supports the finder returning results quickly, often within a few milliseconds, depending on implementation details. As discussed below in more detail, various optimizations may be utilized with the StructureChangeEvent approach to make the entire finder process faster for desktop applications.

Figure 4:
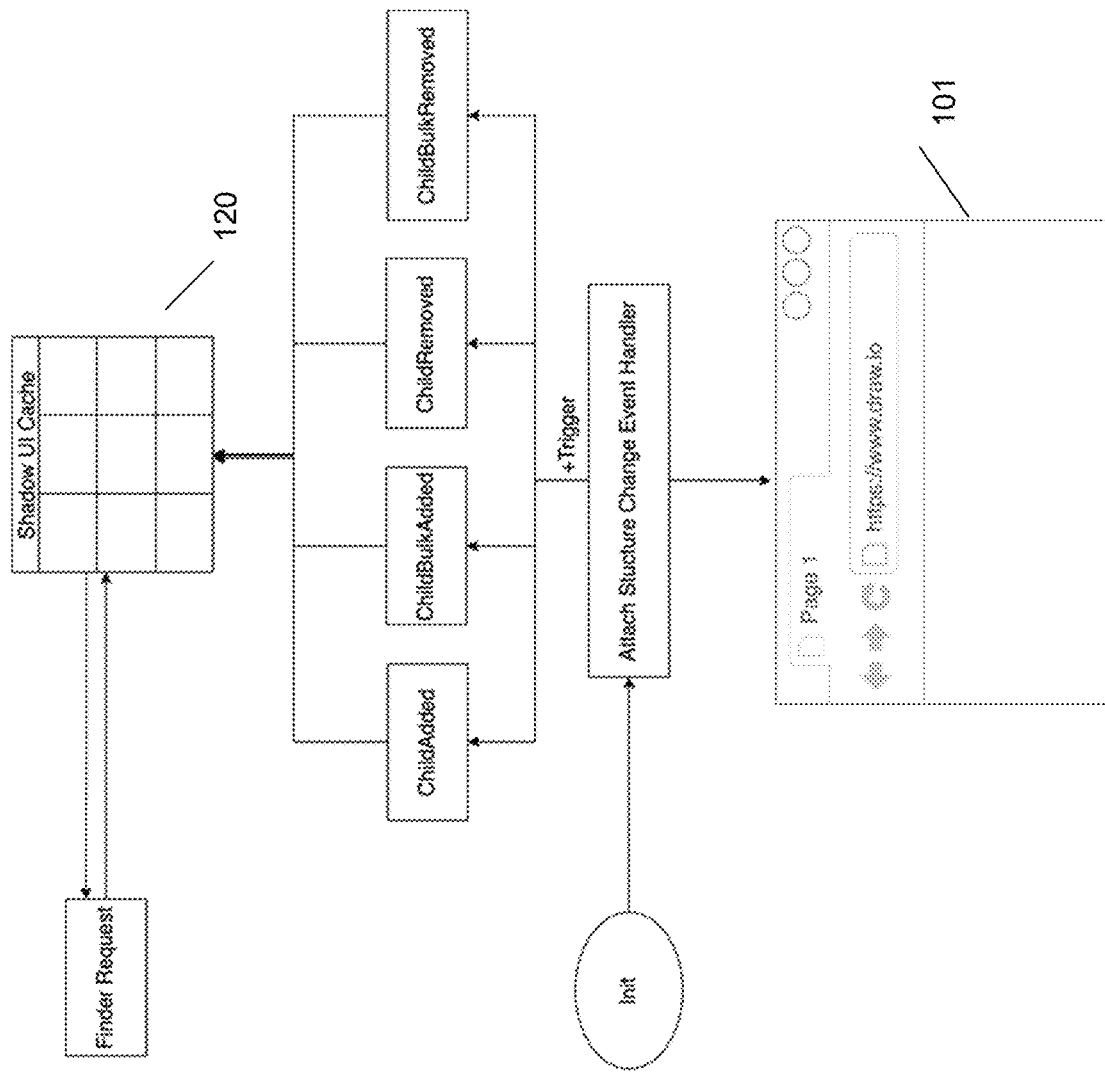
FIG. 4 illustrates an example of the use of a structure change event handler to handle the event raised when a UI automation tree structure has changed in accordance with an implementation.

An aspect of the operation of a StructureChangedEventHandler (or MutationObserver for Desktop) will now be described with regards to FIG. 4. FIG. 4 illustrates a shadow UI cache 120, a finder request from a finder, and a structure change event handler that is attached to a target application to detect structural changes to a UI such as a child added, a child removed, child bulk added, and child bulk removed. FIG. 5 is a table illustrating in more detail examples of structural changes for examples of different structure change types.

The structure change event handler represents a method implemented to handle the event raised when the UI Automation tree structure has changed. This is similar to the JavaScript MutationObserver interface which provides the ability to watch for changes being made to the DOM tree. In one implementation, a listener is attached to the target application for listening to structure change events. This listener receives child added and removed events along with the automation elements inside the handler. This event data is used to populate the shadow UI cache. Then finder requests do their first lookup in the shadow UI cache before falling back to default finder techniques to find elements from the application directly using UIAutomation Find* APIs.

There are a variety of considerations to consider in using a structure change event that may result in a cache miss. For some elements, the structure change event comes even before the element was created so a COM exception is thrown when properties are retrieved. Some elements do not send a structure change event. Also, some elements when added raise an event with ZERO positions, which means that positions are needed for showing the tooltips. This occurs mainly when the element is still rendering on the UI. The shadow UI cache will thus occasionally have some cache misses unless additional steps are used to reduce or eliminate cache misses. To address the cache miss issues, additional steps may be taken. This includes the use of one or both of a traversal path algorithm and a cache update using FindAll.

The traversal path engine 146 implements a traversal path algorithm to determine a traversal path for a traversal path finder. The traversal path finder requires the traversal path to be captured during a picking stage. The picker 148 captures the path in a tree format which is easier to deserialize to an exact path. In one implementation, this is based on the principle of best-case time complexity of the tree traversal algorithm when the exact path of the element is clearly known. Then the time to reach the element is at worst the depth of the tree. The picker captures the path in a tree format which is easier to deserialize to an exact path. The traversed element data structure contains properties like name, control type, index, and child element.

In one implementation, the finder utilizes a Breadth First Search so the traversal time is extremely high when the element to be reached is very deep in the tree. The traversal path finder also requires the traversal path to be captured during the picking stage.

Figure 7:
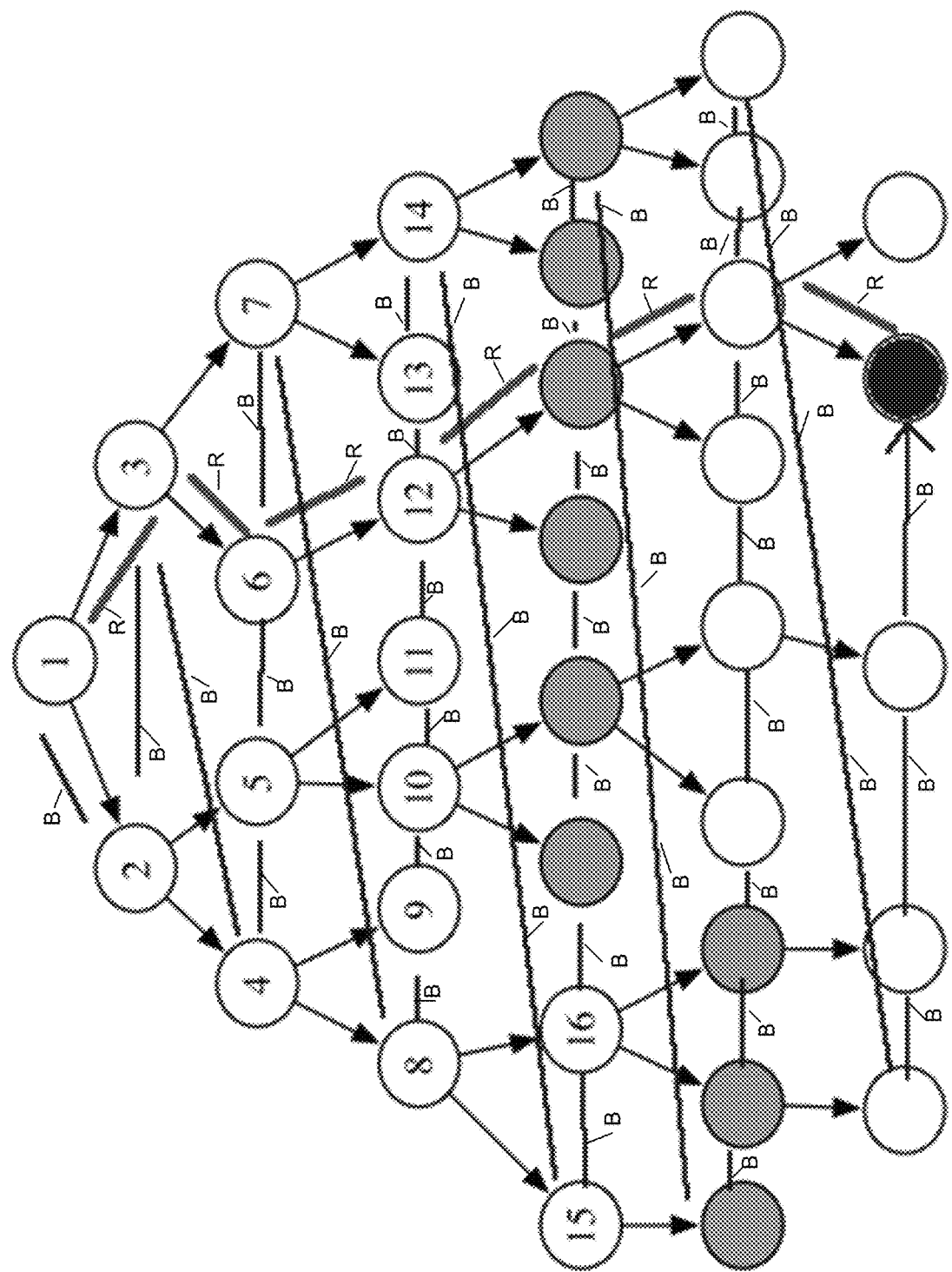
FIG. 7 illustrates a visual representation of the traversal path in accordance with an implementation.

A sample traversal path captured is illustrated in FIG. 6. A visual representation of the traversal path is shown in FIG. 7. The blue line, B, in the FIG. 7 represents the number of jumps needed to reach the element we are interested in. The red line, R, represents the number of jumps needed in the tree traversal algorithm. The worst-case time complexity is that the depth of the tree is usually not more than 20 in most of the UI applications even with more than 20,000 elements. So, the traversal-based finder would find quickly or also fail quickly if there is a change in the path.

In one implementation, whenever there is a miss in the cache, there is a fallback to the traversal path and a return of the element. In one implementation, after an element is returned, the algorithm tries to re-populate the cache using the FindAll API to ensure the missing element is back in the cache.

Figure 8:
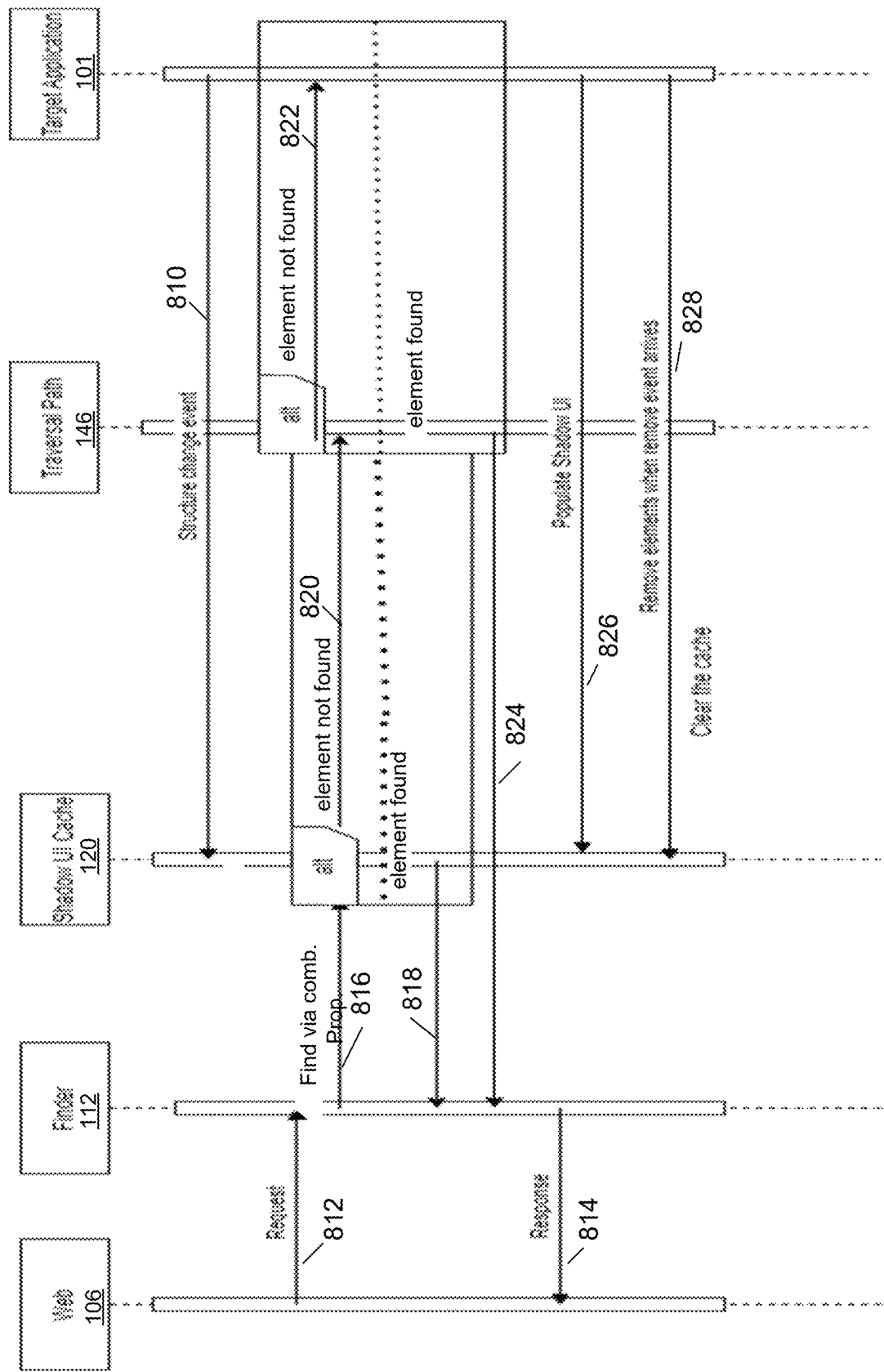
FIG. 8 illustrates a sequence diagram in accordance with an implementation.

FIG. 8 is an interaction sequence diagram that illustrates an example of an overall process that may be implemented in a system 180 of FIG. 1. The sequence diagram illustrates interactions between a web component 106 (for the DAP to make requests for element information and receive responses), a finder 112, a shadow UI cache 120, a traversal path 146, and a target application 101 (the application for which help information is to be provided).

A request 812 is sent from the Web component 106 to the finder 112 and a response 814 is received from the finder. The finder 112 attempts to find the screen element information in the shadow UI cache 120 using a combination of properties, as illustrated by arrow 816. The Web component 106 is the component that contains the main framework for the DAP. The Web component 802 is responsible for creation of requests based on search criteria and processing the response to show the DAP content.

In one implementation, the finder request is a request to find the target UI elements. The finder request has all necessary properties of the element that is required for the find operation. In one implementation, a native component is the component that is responsible for interacting and finding the elements on the desktop application using the finder functions.

The shadow UI cache 120 in this implementation is implemented to shadow the tree structure of the target application.

As illustrated by arrow 810, a structure change event is illustrated. This is supported by accessibility enablement and an event listener. During the process of enabling accessibility features, a structure change event listener is attached to the root element of the target application to monitor for structure change events. This listener is responsible for detecting changes in the UI structure. Accessibility refers to the ability of an application or software system to be programmatically accessed and interacted with by assistive technologies or automated testing frameworks. It involves providing an accessible interface that allows external programs or tools to navigate, query, and interact with the user interface (UI) elements of an application.

In one implementation, the structure change events 810 are events sent by the element whose structure is changed along with the runtime id. For example, the structure change events in one implementation includes ChildAdded, ChildBulkAdded, ChildRemoved and ChildBulkRemoved, which are all events sent by the element whose structure is changed along with the runtime id. Based on the type of event the cache is modified.

In one implementation, the shadow UI cache 120 is constructed in response to the event listener initiating the construction of a shadow UI cache, which stores elements for which the structure change event is raised. Elements affected by structural changes are stored within this cache for quick access.

As an illustrative example, consider initial finder request handling. When a finder request is received from the web component 106 to the native component, the element search is initially attempted within the shadow UI cache 120. The key used for storing elements in the shadow UI cache corresponds to their structural attributes. If the shadow UI cache 120 stores the elements to respond to the find request, the elements are provided 818 to the finder 112.

As illustrated by arrows 820 and 822, there is support for a fallback approach via Traversal Path 146 Algorithm. If the requested element is not found in the shadow UI cache 120, the traversal path algorithm is invoked to locate the element. This algorithm navigates through the UI hierarchy based on specific criteria to identify the target element. If the traversal path locates the elements for the find request, it sends them 824 to the finder 112.

A secondary fallback approach can also be provided. An example of a secondary fallback approach is UIAutomation FindAll Method (Conditional). This secondary fallback approach is employed in cases where the traversal path algorithm is unsuccessful, a fallback to the UIAutomation FindAll method is employed. This method retrieves a list of elements from which the final list of found elements is then filtered.

As illustrated by arrow 826, a shadow UI cache population/repopulation process may be included. An example population process includes the shadow UI cache being repopulated using the FindAll method on the root element. This ensures that all elements in the UI tree are captured in the cache, including those that may have been missed during the structure change event.

As illustrated by arrow 828, cache management and maintenance rules may be implemented to clear the shadow UI cache 120. The cache management and maintenance rules may include clearing elements of the shadow UI cache 120 in response to a child removed event received from the structure change event. Additionally, a rule may be implemented to clear the shadow UI cache according to other rules, such as clearing the cache periodically according to a schedule (e.g., scheduled every half an hour) to prevent memory leaks in cases where no child removed event is detected. The shadow UI cache is reconstructed when a structure change child added event is received, ensuring its accuracy for subsequent finder requests.

Figure 9A:
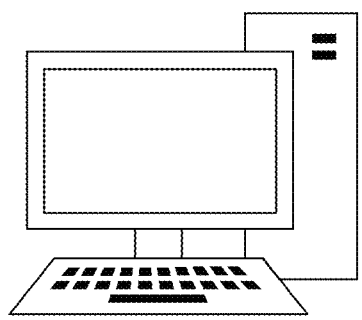
FIGS. 9A and 9B illustrate a general computer system environment for implementing a desktop application in accordance with an implementation.
Figure 9B:
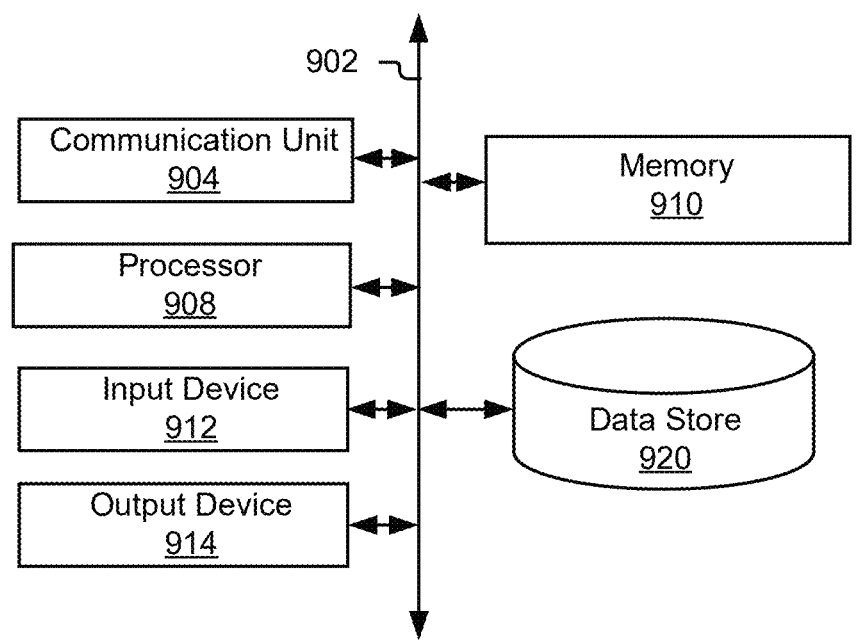

It will be understood that the desktop computer may be implemented in a conventional computer architecture to support execution of computer software of the target application and DAP operation and performing the processes previously discussed FIG. 9A illustrates an example desktop computer and FIG. 9B represented configured modules. As illustrated by FIG. 9B, a desktop computing environment may include a processor 908, a memory 910, a communication unit 904, an output device 914, an input device 912, and a data store 920, which may be communicatively coupled by a communication bus 902. The communication unit 904 may support communication over a network such as the Internet. The desktop computing system may support operation of the target application and the DAP. The computing system of FIG. 9A and FIG. 9B is provided by way of example and it should be understood that it may take other forms and include additional or fewer components without departing from the scope of the present disclosure. For instance, various components of the computing device may be coupled for communication using a variety of communication protocols and/or technologies including, for instance, communication buses, software communication mechanisms, computer networks, etc. While not shown, the computing system may include various operating systems, sensors, additional processors, and other physical configurations. The processor 908, memory 910, communication unit 904, etc., are representative of one or more of these components.

The overall finder process can be implemented to provide efficient and reliable element identification within the UI automation process, considering both real-time structural changes and scenarios where cached data might need updating. One aspect is that building a shadow UI cache on the structure change event is a reliable trigger source with good performance to build the cache and is observed to be raised in almost all the general accessibility compliant applications. The speed improvement varies from application to application. On average it has become 80% faster over existing solutions and irrespective of the size of the application tree, the find time is less than 200 ms and in the best case with high end machines the time is even less than 50 ms. However, as previously discussed less than a 1 second find time is necessary to have a satisfactory user experience with less than 500 ms being preferred to have a satisfactory user experience.

Table 1, below, summarizes speed improvements for different applications.

TABLE 1

| Application | Speed Improvement | Before (in ms) | After (in ms) |
|---|---|---|---|
| Acturis | ~88% | 1943 | 232 |
| Exceedra | ~81% | 1848 | 383 |
| Teams | ~70% | 712 | 210 |

The cached properties using the FindAllAndBuildCache method aids the fetching of properties of the element in a shorter time, reducing the number of IPC (Inter Process Communication) calls made to the application in comparison to alternate approaches.

IPC calls often create performance impact on an application as they continuously interact with the application to fetch required information and hence increase the overall CPU and memory usage. With the help of FindAllAndBuildCache, the required properties are cached in a manner that does require excessive IPC calls to the application. This improves the performance and reduces the CPU and memory consumption and thus reduces the load on the application put by the finder.

The use of the shadow UI cache can be performed with high accuracy, because of the element detection which starts with shadow UI cache followed (as necessary as a backup) by the traversal path and FindAll API, making it nearly impossible to not find the element. The system of FIG. 1 implements an innovative cache-based approach that significantly boosts performance without the need for selectors. In one implementation, a shadow UI cache representation of the real user interface of a target application is created using detected structure change events.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

In some instances, various implementations may be presented herein in terms of algorithms and symbolic representations of operations on data bits within a computer memory. An algorithm is here, and generally, conceived to be a self-consistent set of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

To ease description, some elements of the system and/or the methods are referred to using the labels first, second, third, etc. These labels are intended to help to distinguish the elements but do not necessarily imply any particular order or ranking unless indicated otherwise.

It should be borne in mind, however, that all of these and similar terms are to be associated with the appropriate physical quantities and are merely convenient labels applied to these quantities. Unless specifically stated otherwise as apparent from the following discussion, it is appreciated that throughout this disclosure, discussions utilizing terms including "processing," "computing," "calculating," "determining," "displaying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Various implementations described herein may relate to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD ROMs, and magnetic disks, read-only memories (ROMs), random access memories (RAMs), EPROMS, EEPROMs, magnetic or optical cards, flash memories including USB keys with non-volatile memory or any type of media suitable for storing electronic instructions, each coupled to a computer system bus.

The technology described herein can take the form of an entirely hardware implementation, an entirely software implementation, or implementations containing both hardware and software elements. For instance, the technology may be implemented in software, which includes, but is not limited to, firmware, resident software, microcode, etc. Furthermore, the technology can take the form of a computer program object accessible from a computer-usable or computer-readable medium providing program code for use by or in connection with a computer or any instruction execution system. For the purposes of this description, a computer-usable or computer readable medium can be any non-transitory storage apparatus that can contain, store, communicate, propagate, or transport the program for use by or in connection with the instruction execution system, apparatus, or device.

A data processing system suitable for storing and/or executing program code may include at least one processor coupled directly or indirectly to memory elements through a system bus. The memory elements can include local memory employed during actual execution of the program code, bulk storage, and cache memories that provide temporary storage of at least some program code in order to reduce the number of times code must be retrieved from bulk storage during execution. Input or I/O devices (including, but not limited to, keyboards, displays, pointing devices, etc.) can be coupled to the system either directly or through intervening I/O controllers.

Network adapters may also be coupled to the system to enable the data processing system to become coupled to other data processing systems, storage devices, remote printers, etc., through intervening private and/or public networks. Wireless (e.g., Wi-Fi™) transceivers, Ethernet adapters, and Modems, are just a few examples of network adapters. The private and public networks may have any number of configurations and/or topologies. Data may be transmitted between these devices via the networks using a variety of different communication protocols including, for example, various Internet layer, transport layer, or application layer protocols. For example, data may be transmitted via the networks using transmission control protocol/Internet protocol (TCP/IP), user datagram protocol (UDP), transmission control protocol (TCP), hypertext transfer protocol (HTTP), secure hypertext transfer protocol (HTTPS), dynamic adaptive streaming over HTTP (DASH), real-time streaming protocol (RTSP), real-time transport protocol (RTP) and the real-time transport control protocol (RTCP), voice over Internet protocol (VOIP), file transfer protocol (FTP), WebSocket (WS), wireless access protocol (WAP), various messaging protocols (SMS, MMS, XMS, IMAP, SMTP, POP, WebDAV, etc.), or other known protocols.

Finally, the structure, algorithms, and/or interfaces presented herein are not inherently related to any particular computer or other apparatus. Various general-purpose systems may be used with programs in accordance with the teachings herein, or it may prove convenient to construct more specialized apparatus to perform the required method blocks. The required structure for a variety of these systems will appear from the description above. In addition, the specification is not described with reference to any particular programming language. It will be appreciated that a variety of programming languages may be used to implement the teachings of the specification as described herein.

The foregoing description has been presented for the purposes of illustration and description. It is not intended to be exhaustive or to limit the specification to the precise form disclosed. Many modifications and variations are possible in light of the above teaching. As will be understood by those familiar with the art, the specification may be embodied in other specific forms without departing from the spirit or essential characteristics thereof. Likewise, the particular naming and division of the modules, routines, features, attributes, methodologies, and other aspects are not mandatory or significant, and the mechanisms that implement the specification or its features may have different names, divisions and/or formats.

Furthermore, the modules, routines, features, attributes, methodologies, and other aspects of the disclosure can be implemented as software, hardware, firmware, or any combination of the foregoing. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future. Additionally, the disclosure is in no way limited to implementation in any specific programming language, or for any specific operating system or environment.

In the above description, for purposes of explanation, numerous specific details are set forth in order to provide a thorough understanding of the present disclosure. However, it should be understood that the technology described herein can be practiced without these specific details. Further, various systems, devices, and structures are shown in block diagram form in order to avoid obscuring the description. For instance, various implementations are described as having particular hardware, software, and user interfaces. However, the present disclosure applies to any type of computing device that can receive data and commands, and to any peripheral devices providing services.

What is claimed is:

1. A computer-implemented method of finding visual user interface elements of a desktop application for a digital adoption platform (DAP), comprising:
   monitoring structure change automation events in a graphical user interface (GUI) of a target desktop application;
   updating a shadow user interface (UI) cache of the UI screen elements in response to detecting structure change automation events; and
   in response to a request from a finder for screen element information to provide DAP assistance as a user navigates the target desktop application, accessing the shadow UI cache to search for screen element information to fulfill the request.

2. The computer-implemented method of claim 1, further comprising utilizing a structure change event handler for detecting structure change automation events to the target desktop application.

3. The computer-implemented method of claim 1, wherein in a response to a cache miss of the shadow UI cache, a traversal path engine is utilized to traverse a UI screen element tree hierarchy to search for one or more screen elements to fulfill the request from the finder.

4. The computer-implemented method of claim 1, further comprising initially populating the shadow UI cache utilizing a FindAll API.

5. The computer-implemented method of claim 1, further comprising updating the shadow UI cache after a cache miss.

6. The computer-implemented method of claim 1, further comprising removing one or more references to UI elements in the shadow UI cache in response to detecting a remove event.

7. The computer-implemented method of claim 1, further comprising clearing the shadow UI cache in response to a pre-determined cache clearance condition.

8. The computer-implemented method of claim 1, wherein the structure change automation events include at least one of a child element added, a child element removed, children bulk added, children bulk removed, and children invalidated.

9. The computer-implemented method of claim 1, wherein the shadow UI cache comprises information associated with a set of IUIAutomation Elements corresponding to visual screen elements of the UI.

10. A computer-implemented method of finding visual user interface elements of a desktop application for a digital adoption platform (DAP), comprising:
  attaching a structure change event handler to a target desktop application for which DAP assistance is to be provided as a user navigates a graphical user interface (GUI) of the target desktop application;
  initially populating a shadow user interface (UI) cache with element information of the graphical user interface of the target desktop application;
  monitoring structure change automation events in the GUI of the target desktop application;
  updating the shadow UI cache representation of the UI screen elements in response to detecting structure change automation events; and
  in response to a request from a finder for screen element information to provide DAP assistance as a user navigates the target desktop application, accessing the shadow UI cache to search for screen element information to fulfill the request.

11. The computer-implemented method of claim 10, wherein in a response to a cache miss of the shadow UI cache, a traversal path engine is utilized to traverse a UI screen element tree hierarchy to search for one or more screen elements to fulfill the request from the finder.

12. The computer-implemented method of claim 11, where the shadow UI cache is updated in response to the cache miss.

13. The computer-implemented method of claim 10, further comprising populating the shadow UI cache utilized a FindAll API.

14. The computer-implemented method of claim 10, further comprising removing one or more references to UI elements in the shadow UI cache in response to detecting a remove event.

15. The computer-implemented method of claim 10, further comprising clearing the shadow UI cache in response to a pre-determined cache clearance condition.

16. The computer-implemented method of claim 10, wherein the structure change automation events include at least one of a child element added, a child element removed, children bulk added, children bulk removed, and children invalidated.

17. The computer-implemented method of claim 10, wherein the shadow UI cache comprises information associated with a set of IUIAutomation Elements corresponding to the visual screen elements of the UI.

18. The computer-implemented method of claim 10, wherein a finder time is less than 1 second.

19. The computer-implemented method of claim 10, wherein a finder time is less than 500 milliseconds.

20. The computer implemented method of claim 10, wherein the shadow UI cache stores screen element reference represents a tree hierarchy of a user interface.

21. The computer implemented method of claim 10, wherein the shadow UI cache is a region of cache memory devoted to caching element information for a particular type of target application.

* * * * *